United States Patent [19]

Neuenfeldt et al.

[11] 4,238,291
[45] Dec. 9, 1980

[54] DEVICE FOR COUPLING PIPELINES IN NUCLEAR REACTOR PRESSURE VESSELS, ESPECIALLY IN BOILING WATER REACTORS

[75] Inventors: Walter Neuenfeldt, Schmitten; Milan Sülić, Seulberg; Gerd Pollak, Kelsterbach, all of Fed. Rep. of Germany

[73] Assignee: Kraftwerk Union Aktiengesellschaft, Mülheim an der Ruhr, Fed. Rep. of Germany

[21] Appl. No.: 869,362

[22] Filed: Jan. 13, 1978

[30] Foreign Application Priority Data

Jan. 14, 1977 [DE] Fed. Rep. of Germany ....... 2701472

[51] Int. Cl.² .............................................. G21C 9/00
[52] U.S. Cl. ........................................ 176/38; 176/60; 176/87
[58] Field of Search ........................ 176/37, 38, 87, 60, 176/65

[56] References Cited

U.S. PATENT DOCUMENTS

| 3,249,505 | 5/1966 | Laurent et al. | 176/87 |
| 3,525,669 | 8/1970 | Germer | 176/87 |
| 3,537,420 | 11/1970 | Chollet et al. | 176/65 |
| 3,807,772 | 4/1974 | Delisle et al. | 176/87 |
| 3,937,255 | 2/1976 | Barnet | 176/38 |
| 4,028,176 | 6/1977 | Kraupa | 176/87 |
| 4,062,726 | 12/1977 | Walling | 176/65 |
| 4,087,323 | 5/1978 | Sullivan et al. | 176/38 |
| 4,092,490 | 5/1978 | Schabert et al. | 176/87 |
| 4,116,765 | 9/1978 | BoyMarcotte et al. | 176/38 |
| 4,118,278 | 10/1978 | Wampole | 176/38 |

FOREIGN PATENT DOCUMENTS

| 2439224 | 2/1976 | Fed. Rep. of Germany | 176/60 |
| 2624007 | 12/1976 | Fed. Rep. of Germany | 176/38 |
| 626337 | 10/1961 | Italy | 176/60 |
| 503945 | 4/1971 | Switzerland | 176/38 |

*Primary Examiner*—Samuel W. Engle
*Assistant Examiner*—S. A. Cangialosi
*Attorney, Agent, or Firm*—Herbert L. Lerner

[57] ABSTRACT

For coupling pipelines in a nuclear reactor pressure vessel with a core flood line formed of a first line section extending sealingly through a housing wall of the reactor pressure vessel and secured thereto, and a second line section disposed in the interior of the pressure vessel and couplable sealingly to the first line section, the second line section extending through a cover of a core container and terminating in the core container, a device includes means for forming the second line section and the core container cover into a structural unit so that the second line section together with the core container cover is liftable out of and insertable into the pressure vessel upon opening the latter for selectively inspecting, servicing and both inspecting and servicing the same, the first and second line sections having a mutual coupling location, means defining coaxial sealing surfaces disposed at the mutual coupling location for holding the first and second line sections in mutual engagement, the coaxial sealing surfaces having a contact pressure therebetween deriving from weight per se and bracing force of the core container cover oriented in axial direction of the pressure vessel, the first and the second line sections being in mutual spring-biased engagement at the mutual coupling location thereof.

8 Claims, 4 Drawing Figures

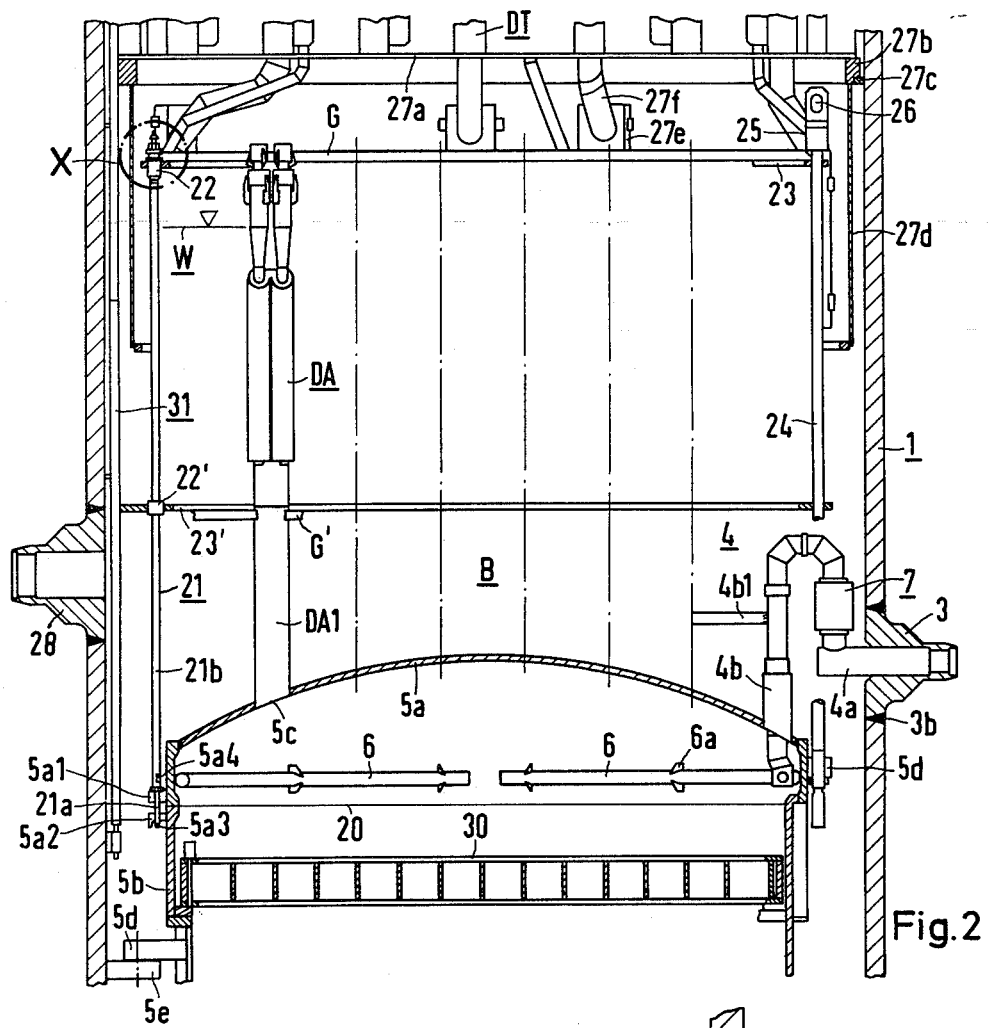
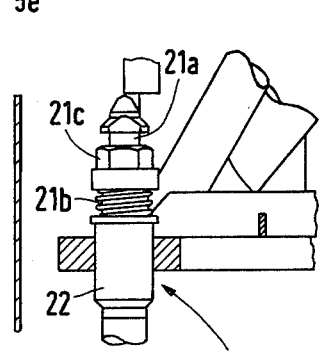
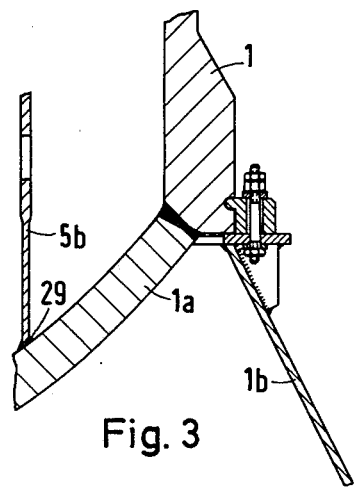

DEVICE FOR COUPLING PIPELINES IN NUCLEAR REACTOR PRESSURE VESSELS, ESPECIALLY IN BOILING WATER REACTORS

The invention relates to a device for coupling pipelines in nuclear reactor pressure vessels, especially in boiling water reactors, with a core flood line formed of a first line section extending sealingly through a housing wall of the reactor pressure vessel and secured to the latter, and second line section disposed in the interior of the pressure vessel and couplable sealingly to the first line section, the second line section extending through a cover of a nuclear core container and terminating in the core container.

Such a device has become known heretofore, for example, from the article entitled: Steam-Water Separators and Steam Dryers, by G. Pollak in the periodical "Konstruktion," 1971, Book 11, Page 442, FIG. 1, wherein, however no particulars are otherwise provided or recognizable details presented concerning how the coupling of both line sections of the core spray or flood system is effected. In two heretofore known arrangements, the steam separators are fastened to the cover of the core container. A number of problems is produced thereby: a varying axial and radial thermal expansion of the pressure vessel, the built-ins or installations in the pressure vessel as well as the core flood line then exists. The line coupling of the core flood line must maintain the tightness or impermeability thereof to leaks. A reliable and rapid coupling operation for both core flood line sections with a minimum of tool outlay or expense is desired. As many sections or parts as possible, including sections of the core flood line, should be disassemblable so that an inspection of these disassembled parts or sections as well as also an inspection of the remaining reactor pressure vessel per se is afforded. During the operation of the reactor, oscillations or vibrations occur in the coolant circulatory loop (boiling water reactor) or in the primary coolant circulatory loop (pressurized water reactor); the coupling between the core flood line sections must therefore also be vibration-proof.

It is accordingly an object of the invention to provide a device for coupling pipelines in nuclear reactor pressure vessels, especially in boiling water reactors, which meet the foregoing requirements which offer improvement over prior art devices of this general type. More specifically, it is an object of the invention to provide such a coupling device for a core flood line, especially for boiling water reactors which, with good sealing action, is thermally displaceable and vibration-proof, and which does not require actuation of threaded fasteners for engagement or releasing thereof.

With the foregoing and other objects in view, there is provided, in accordance with the invention, for coupling pipelines in a nuclear reactor pressure vessel with a core flood line formed of a first line section extending sealingly through a housing wall of the reactor pressure vessel and secured thereto, and a second line section disposed in the interior of the pressure vessel and couplable sealingly to the first line section, the second line section extending through a cover of a core container and terminating in the core container, a device comprising means for forming the second line section and the core container cover into a structural unit so that the second line section together with the core container cover is liftable out of and insertable into the pressure vessel upon opening the latter for selectively inspecting, servicing and both inspecting and servicing the same, the first and second line sections having a mutual coupling location, means defining coaxial sealing surfaces disposed at the mutual coupling location for holding the first and second line sections in mutual engagement, the coaxial sealing surface having a contact pressure therebetween deriving from weight per se and bracing forces of the core container cover oriented in axial direction of the pressure vessel, the first and the second line sections being in mutual spring-biased engagement at the mutual coupling location thereof.

The advantages attainable with the device of the invention are, primarily, that a thermally displaceable coupling location is provided which assures a virtually uniform contact pressure, under all operating conditions, and that the coupling and uncoupling operation occurs automatically without the use of special tools.

In accordance with another feature of the invention, the coaxial sealing surfaces are engageable at a ball-and-socket seat. This produces, on the one hand, a linear sealing surface of high contact pressure and, on the other hand, produces a centering action of the line sections during the coupling operation.

In accordance with a further feature of the invention, the first line section has an upwardly directed ball seat-mouthpiece forming the ball of the ball-and-socket seat, and the second line section has a downwardly directed cone seat-counter-support member forming the socket of the ball-and-socket seat, the counter-support member being formed as a pipe bushing mounted with spring bias and displaceable longitudinally on a guidance collar formed on the second line section, the spring bias being afforded by compression spring means disposed intermediate the pipe bushing and the guidance collar.

The greatest part of the coupling is accordingly disassemblable and inspectable, and pre-assembly of the guidance collar, the compression springs and pipe bushing in a relatively simplified manner is possible.

In accordance with an added feature of the invention, axially normal, inwardly directed pins are mounted on the counter-support member and guided, in axial direction of the counter-support member, in longitudinal grooves formed in the guidance collar, the longitudinal grooves having end flanks for limiting displacement of the counter-support member in opposite axial directions.

In accordance with an additional feature of the invention, opposing end flanges formed, respectively, on the guidance collar and on the counter-support member are included and disposed in mutual alignment, the compression spring means comprising at least one helical compression spring mounted between the end flanges.

In accordance with yet another feature of the invention, also included is a pipe apron disposed at the mutual coupling location radially inwardly of the compression spring means for shielding the compression spring means from the interior of the first and second line sections.

In accordance with yet a further feature of the invention, included are means for introducing an initial flow of flood water to the core flood line forming the first and second line sections, the second line section at the mutual coupling location having surfaces subjectible to application of interior pressure from the pressure vessel and pressure of the flood water, the area of the surfaces having a mutual ratio effecting an increase in contact pressuere applied between the coaxial sealing surfaces upon introduction of the initial flow of flood water.

In accordance with yet an additional feature of the invention, the steam separators in the reactor pressure vessel overlie and are connected to the interior of the core container through the cover thereof, and means are included for incorporating the steam separators into the structural unit formed of the second line section and the core container cover.

In accordance with a concomitant feature of the invention, there are provided, in combination, a device for coupling pipelines and a pressure vessel, for example, for steam generators of pressurized water nuclear reactors having a first line section extending sealingly through a housing wall of the pressure vessel and secured thereto, and a second line section disposed in the interior of the pressure vessel and forming a structural unit with at least one installation within the pressure vessel, releasable bracing means for holding the installation in position, in closed condition of the pressure vessel, against stops provided in the pressure vessel, the coupling device holing the first and second line sections in engagement due to a force lock by the bracing means, the bracing means being releasable for removing the installation and simultaneously automatically uncoupling the coupling device, and the bracing means being lockable for holding an installation received in the pressure vessel and simultaneously automatically coupling the first and second line sections to one another with the coupling device.

Other features which are considered as characteristic for the invention are set forth in the appended claims.

Although the invention is illustrated and described herein as embodied in device for coupling pipelines in nuclear reactor pressure vessels, especially in boiling water reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is an elevational view of the pipeline coupling device reduced in scale with respect to that of FIG. 1 and showing a greater fragment of the pressure vessel, the coupling device being further shown with core flood or spray-line parts thereof together with a bracing system for the cover of the core container;

FIG. 3 is a fragmentary enlarged sectional view of a modified form of the support or bracing for the core container wherein the casing of the core container is welded to the bottom spherical shell of the pressure vessel; and FIG. 4 is an enlarged fragmentary view of FIG. 2 showing details of the structure thereof located within the circle X.

Figure 1:
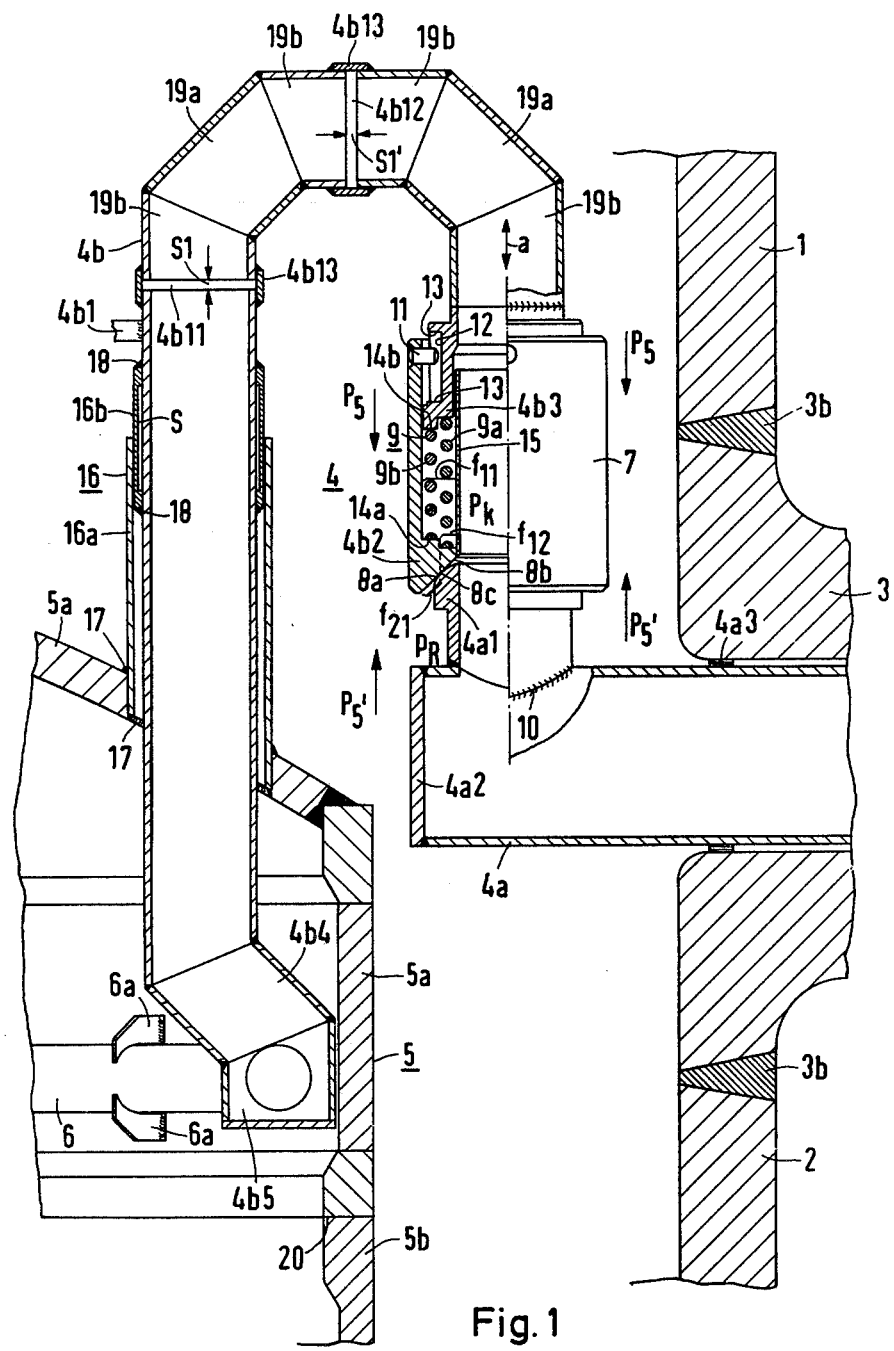
FIG. 1 is a fragmentary sectional view of a pressure vessel of a boiling water nuclear reactor showing a pipeline coupling device, according to the invention, installed therein.

Parts which are not essential to an understanding of the invention have been omitted from FIGS. 1, 2 and 3.

Referring now more specifically to the drawing and first, particularly, to FIG. 1 thereof, there is shown a pressure vessel 1 of a boiling water reactor, only part of the casing wall 2 thereof with a union or connecting stub 3 being visible in the figure. A first line section 4a of a core flood-line or spray-line generally identified by the reference numeral 4 is fastened within the union 3. The first line section 4a is formed as a thermosleeve pipe or tube. The core flood-lines or spray-line 4 belongs to a core flood or spray system of the boiling water reactor which is formed of several core flood or spray lines 4 that are distributed over the periphery of the pressure vessel 1 and, respectively, extend through the cover 5a of the core container 5 and are connected to ring or circular line 6 disposed in the interior of the core-container cover 5a and terminate in the core container 5 through otherwise non-illustrated nozzles or holes provided in the ring line 6. A second line section 4b of the core flood or spray line 4 is connected by a coupling 7 to the first line section 4a.

Cams or platings or any other suitable spacing means $4a3$ welded to the outer periphery of the thermosleeve pipe $4a$ serve as guides therefor when the thermosleeve pipe $4a$ is inserted in axial direction thereof into the union 3; in the illustrated embodiment, four of such cams $4a3$ are uniformly distributed over the periphery of the pipe $4a$ although only two thereof are actually visible in FIG. 1. A welding seam $3b$, as clearly shown in FIG. 1, is provided between the union 3 and the wall 2 of the pressure vessel 1.

The second line section $4b$ of the core flood or spray line 4, together with the cover $5a$ of the core container 5 and an array of steam separators DA, forms a structural unit B (FIG. 2), note the supporting or retaining dogs $6a$ for the flood ring 6 at the inner periphery of the container cover $5a$, and is liftable together with the core-container cover $5a$ out of the pressure vessel 1 if the pressure vessel 1 is opened for the purpose of inspection and/or servicing, and is reintroducible into the pressure vessel 1. During the lifting, uncoupling of the two line sections $4a$ and $4b$ in the region of the coupling location 7 is automatically effected and, likewise, coupling is effected automatically when the core-container cover $5a$ is reinstalled. For this purpose, the first and the second line sections $4a$ and $4b$ are in mutual contact at the coupling location 7 by means of coaxial sealing surfaces $8a$ and $8b$, the contact pressure between the sealing surfaces $8a$ and $8b$ being applied by the bracing forces oriented in axial direction of the pressure vessel 1, inclusive of the weight per se of the core-container cover $5a$ and of the remaining parts of the structural unit B, namely the second part of the line section $4b$ and the steam separators DA. The axial forces exerted by the core-container cover on the coupling 7 through the line section $4b$ are represented symbolically by the arrow $P_5$, and the reaction forces, that are applied by the first line section $4a$ and the holder thereof, are identified as $P_5'$. Since the line section $4b$ is bent in a somewhat U-shaped manner and overlaps the line section $4a$, certain moments are also produced upon the line section $4b$. Likewise, moments occur which stress the line section $4a$ because the latter projects inwardly. These bending moments are able to be controlled, however, through suitably sturdy dimensioning of the line sections $4a$ and $4b$ and bracing or stiffening struts $4b1$ (note FIG. 2) in the course of the line section $4b$. In vicinity of pipe joints $4b11$ and $4b12$, where the pipe sections are disposed opposite one another with respective gaps S1 and S1' therebetween and are surrounded by rings $4b13$ welded thereon, an axial and radial tolerance equalization is able to be attained during assembly i.e. before being finally welded together. Moreover, due to the hereinafore-described course of the lines, the thermal elasticity of the core flood line 4 is increased. Of special significance for the thermal elastic seal at the sealing surfaces 8a and 8b is, however, the spring-loaded contact or engagement by means of the compression spring arrangement 9 regarding which further reference will be made hereinbelow. The first and the second line section 4a and 4b are in engagement with one another by means of a ball-and-socket seat of the sealing surfaces 8a and 8b thereof. The sealing surface 8b is conically formed, the sealing surface 8a spherical, so that an application or contact mainly along a circular line in the region 8c is produced, it being also clear that an exchange of the members i.e. the surface 8a being conical and the surface 8b spherical, is possible. As is apparent, the first line section 4a is provided with an upwardly directed ball seat-mouthpiece 4a1 which is formed as a pipe connection or union and is welded at the location 10 to the line section 4a. The latter is closed from the interior of the reactor by means of an end wall 4a2, so that the water that is to be sprayed in can take its path only through the coupling location 7. For developing the ball seat-mouthpiece 4a1, the pipe union associated therewith is reinforced at the outer end thereof. The second line section 4b is provided with a downwardly directed cone seat-counter bearing member 4b2. This is constructed as a pipe bushing which is mounted with spring loading on a guidance collar or throat 4b3 of the second line section 4b with the intermediary of the hereinaforementioned compression spring elements 9 longitudinally displaceable in axial direction a of the pressure vessel 1. The counter-bearing member 4b2 is guided in axial direction a with axially normal, inwardly directed pins 11 in longitudinal grooves 12 formed in the guidance collar 4b3, the lift or stroke of the counter-bearing member 4b2 being limited in both axial directions by the end flanks 13 of the grooves 12. The groove end flanks 13 serve, accordingly, as stops, and the grooves 12 per se produce together with the pins 11 a safety device against torsion for the counter-bearing member 4b2. When the coupling is disassembled, these pins 11 hold the entire unit 4b2, 4b3 together. Between the opposing mutually aligned and stepwise separated end flanges 14a and 14b of the counter-bearing member 4b2, on the one hand, and of the guidance collar or throat 4b3, on the other hand, the helical compression spring arrangement 9 is inserted and, in fact, two coaxial and concentric helical compression springs 9a and 9b are provided that are mounted on a respective step-shaped landing of the end flanges 14a and 14b. The compression spring elements 9 are covered by a pipe apron 15 at the inner periphery of the line section 4b.

The line section 4b is guided in the core container cover 5a by means of a thermal elastic passageway member 16. The latter is formed of an outer sleeve or bushing 16a welded at the lower end thereof sealingly to the cover 5a by means of inner and outer round welding seams 17, and an inner sleeve or bushing 16b seated on the line section 4b, the inner sleeve 16b surrounding the pipe 4b with the gap S and welded at both ends thereof to the pipe 4b at the location 18. About half of the axial length of the inner sleeve 16b is surrounded by the outer sleeve 16a, and this overlapping region, which forms a sealed sliding seat, respresents an axial guide; the actual fastening location is formed between the supporting or retaining dogs 6a and the flood ring 6.

The pipe 4 is provided at the lower end thereof with an offset or angular bend 4b4 which is connected with a box-shaped end portion 4b5 to the flood ring 6. The upper U-loop of the pipe 4b is formed by pipe members 19a having trapezoidal longitudinal section and pipe members 19b having a semi-trapezoidal longitudinal section, which are welded to one another.

Within the coupling 7, there is shown the effective surface $f_{11}$ which is exposed to the floodwater pressure $p_k$. The surface $f_{12}$ (which extends to the contact surface 8c in the region of the sealing surface 8a and 8b exposed to the pressure $p_k$) is to be subtracted from this effective surface $f_{11}$. In the outer region of the coupling 7, the pressure of the reactor water $p_R$, which exists in the interior of the pressure vessel 1, prevails, the effective pressure $f_{21}$ being associated therewith (it is the outer part of the conical sealing surface 8b up to the application or contact location 8c). Since the floodwater pressure $p_k$ is greater than the pressure $p_R$ in the interior of the pressure vessel 1, the surface force applied to the sealing surfaces 8a and 8b, which act in the direction $P_5$, is increased during operational start-up of the core flood system. What is essential therefor is that the effective surfaces $f_{11}$ to be associated with the floodwater pressure produce a force in the direction $P_5$ that is greater than the reacting or opposing force.

In FIGS. 2 and 3, like parts to those shown in FIG. 1 are identified by the same reference characters. The axially normal parting line 20 between the core-container cover 5a and the lower part 5b of the core container 5 is clearly shown in FIG. 2. The core container 5 is clamped together by means of axial tension or tie rods 21 (shown at the left-hand side of FIG. 2) i.e. a multiplicity of such tension rods 21 are distributed over the periphery of the core container 5. The tension rods 21 engage or grip respective brackets 5a1 and 5a2 of the cover 5a and the core container 5b, respectively. The tension rod 21 has a shaft 21a and a threaded bushing 21b, which, at the upper end (note FIG. 4), are tightened together by means of a nut 21c and, accordingly, the cover 5a is also pressed against the lower part of the core container 5b. A hammerhead 5a3 extends through a slot formed in the lower bracket 5a2 and grips behind this bracket 5a2 when the tension rod 21 is rotated through an angle of 90° as shown in FIG. 2. To define the latched and unlached position, a guidance groove is formed in the bushing and a pin provided at the tension rod, both at the location 5a4. By means of a pair of pipe sleeves 22 and 22', the tension rod 21 is guided, in upper and middle regions thereof, at respective ring plates 23 and 23' which, for their part, are firmly connected to the steam separators DA and upper and middle support grids G and G' therefor. Riser tubes DA1 of the steam separator DA are fitted into corresponding cover openings 5c and welded in this region to the core-container cover 5a.

In the right-hand side of FIG. 2, the construction of FIG. 1 is shown in reduced scale. Another tension or tie rod 24 (at least three of which are to be considered as being distributed likewise over the periphery of the core container 5) extends through the ring plates 23 and 23' and the lower end thereof, at the bracket 5d, engages the cover 5a. The tension rod 24 is provided at the upper end thereof with a support member 25 formed with an eye 26 in which a hook of a non-illustrated lifting device can engage. Above the steam separator DA, the fragmentarily illustrated steam dryers DT are connected by means of support plates 27a and support rings 27b into one unit and are mounted on brackets 27c at the inner periphery of the pressure vessel 1. A cylindrical apron 27d is connected to the support ring 27b, and has water outlet boxes 27e fastened to the inner periphery thereof, wherein outlet pipes 27f of the steam dryers DT terminate. The water level W in the pressure vessel 1 is clearly shown in FIG. 2.

After the steam dryer DT disposed above the structural unit B has been removed from the pressure vessel 1 (for this purpose, the pressure vessel 1 is opened beforehand and non-illustrated tensioning or clamping means for the steam dryers DT have been loosened or released) and, after loosening the nuts 21c and the hammerhead latch 5a3, the flange connection 5a1, 5a2 can be opened and the steam separator DA together with core-container cover 5a and the core flood line 4b (structural unit B) can be lifted upwardly, the tension rods 24 with the support members 25 serving for the engagement of the lifting tool. The coupling 7 between the core flood-line sections 4a and 4b thereby loosens or is released automatically, whereas during insertion and lowering of the structural unit B, they are again automatically coupled. Consequently, with the otherwise non-illustrated feedwater distributor or manifold (which should be considered to be connected to the union 28), a similar automatic coupling in the vicinity of a coupling location can be provided. What is essential for the coupling location 7 is that an axial (and, to a slight extent, also radial and tangential) displacement, dependent upon thermal expansion, of the line 4 is afforded without impairing the sealing effect. It is furthermore, essential that the axial forces that are required for applying contact pressure to the cone-and-sphere or ball-and-socket seat within the coupling 7, are applied through the compression springs 9 due to the axial tensioning, including the weight per se, of structural unit B. The axial forces are transmitted by the core container 5 through the support brackets or paws 5d to the brackets 5e welded to the inner periphery of the pressure vessel 1 (a multiplicity of paws and brackets 5d, 5e being distributed over the periphery).

In the modified embodiment according to FIG. 3, the core container casing 5b is braced or supported upon the base calotte or bottom spherical end wall 1a and welded thereto at the location 29. Also shown in FIG. 3 is a surrounding vertical frame of the pressure vessel.

In FIG. 2, a guidance grid support plate 30 for non-illustrated fuel elements, as well as one of a plurality of guide rods 31 fastened to the inner periphery of the pressure vessel 1 for guiding the structural unit B, when inserting or removing the same, are shown.

There are claimed:

1. For coupling pipelines in a nuclear reactor pressure vessel with a core flood line formed of a first line section extending sealingly through a housing wall of the reactor pressure vessel and secured thereto, and a second line section disposed in the interior of the pressure vessel and couplable sealingly to the first line section, the second line section extending through a cover of a core container and terminating in the core container, a device comprising means for forming the second line section and the core container cover into a structural unit so that the second line section together with the core container cover is liftable out of and insertable into the pressure vessel upon opening the latter for selectively inspecting, servicing and both inspecting and servicing the same, the first and second line sections having a mutual coupling location, means defining coaxial sealing surfaces disposed at said mutual coupling location for holding the first and second line sections in mutual engagement, said coaxial sealing surfaces having a contact pressure therebetween deriving from weight per se and bracing forces of the core container cover oriented in axial direction of the pressure vessel, the first and the second line sections being in mutual spring-biased engagement at said mutual coupling location thereof, the second line section having a guidance collar integral therewith at said mutual coupling location, and including a one-piece counter-support member formed as a pipe bushing carried by said guidance collar, said counter-support member being mounted with spring bias and displaceable longitudinally on said guidance collar, said spring bias being afforded by compression spring means carried by said pipe bushing and disposed intermediate said pipe bushing and said guidance collar.

2. Device according to claim 1 wherein said coaxial sealing surfaces are engageable at a ball-and-socket seat.

3. Device according to claim 2 wherein the first line section has an upwardly directed ball seat-mouthpiece forming the ball of said ball-and-socket seat, and said counter-support member comprising a downwardly directed cone seat forming the socket of said ball-and-socket seat.

4. Device according to claim 3 including axially normal, inwardly directed pins mounted on said counter-support member and guided, in axial direction of said counter-support member, in longitudinal grooves formed in said guidance collar, said longitudinal grooves having end flanks for limiting displacement of said counter-support member in opposite axial directions.

5. Device according to claim 3 including opposing end flanges formed, respectively, on said guidance collar and on said counter-support member and disposed in mutual alignment, said compression spring means comprising at least one helical compression spring mounted between said end flanges.

6. Device according to claim 3 including a pipe apron disposed at said mutual coupling location radially inwardly of said compression spring means for shielding said compression spring means from the interior of the first and second line sections.

7. Device according to claim 1 including means for introducing an initial flow of flood water to the core flood line forming the first and second line sections, the second line section at said mutual coupling location having surfaces subjectible to application of interior pressure from the pressure vessel and pressure of the flood water, the area of said surfaces having a mutual ratio effecting an increase in contact pressure applied between said coaxial sealing surfaces upon introduction of the initial flow of flood water.

8. Device according to claim 1 wherein steam separators in the reactor pressure vessel overlie and are connected to the interior of the core container through the cover thereof, and including means for incorporating the steam separators into said structural unit formed of the second line section and the core container cover.

* * * * *